United States Patent
Alvaro

[19]
[11] Patent Number: 6,114,827
[45] Date of Patent: Sep. 5, 2000

[54] DEVICE FOR CONTROLLING A SYNCHRONOUS ELECTRIC MOTOR WITH A PERMANENT MAGNET ROTOR

[75] Inventor: Nicolino Alvaro, Turin, Italy

[73] Assignee: Plaset Spa, Moncalieri, Italy

[21] Appl. No.: 09/093,125

[22] Filed: Jun. 8, 1998

[51] Int. Cl.⁷ .................................................. H02P 5/28
[52] U.S. Cl. .......................... 318/717; 318/721; 318/718; 318/719; 318/799; 318/265; 318/282
[58] Field of Search .................................. 318/780–800, 318/700, 798, 799, 254, 138, 212, 217, 265, 282, 285, 494, 503, 505, 323, 717–721

[56] References Cited

U.S. PATENT DOCUMENTS

| | | | |
|---|---|---|---|
| 4,084,120 | 4/1978 | Lund | 318/703 |
| 4,085,355 | 4/1978 | Fradella | 318/168 |
| 4,251,758 | 2/1981 | Pedersen et al. | 318/254 |
| 4,409,532 | 10/1983 | Hollenbeck et al. | 318/749 |
| 4,565,962 | 1/1986 | Nagano | 323/351 |
| 4,678,974 | 7/1987 | Guastadini | 318/254 |
| 4,769,581 | 9/1988 | Rilly | 318/254 |
| 5,142,214 | 8/1992 | Purson et al. | 318/722 |
| 5,208,519 | 5/1993 | Dykstra et al. | 318/139 |
| 5,434,491 | 7/1995 | Marioni | 318/700 |

FOREIGN PATENT DOCUMENTS

| | | |
|---|---|---|
| 0574823A | 12/1993 | European Pat. Off. . |
| 0851570A | 7/1998 | European Pat. Off. . |
| 24 57 332 | 6/1976 | Germany . |
| 4410005A | 9/1995 | Germany . |
| 1522371 | 7/1987 | U.S.S.R. . |
| WO86/05336 | 9/1986 | WIPO ............................ H02P 6/02 |

OTHER PUBLICATIONS

Der Geber als Systembaustein, von Dieter Rechinger, 8034 ETZ Elcktrotechnische Zeitschrift 117 1996 Feb., No. 3, Berlin, DE.

*Primary Examiner*—Bentsu Ro
*Assistant Examiner*—Ritor Leykin
*Attorney, Agent, or Firm*—Howrey, Simon, Arnold & White, LLP

[57] ABSTRACT

A device for controlling a synchronous electric motor with a permanent magnet rotor. The device comprises a stator including a winding disposed around a stack of laminations and with which is associated a permanent magnet rotor. Controlled conductor devices are connected to the stator winding and to an AC source. One or more position sensors determine the application to the control inputs of the said controlled conductor devices of electrical control signals having to states which vary as a function of the angular position of the rotor. The arrangement is such that the current is caused to flow in the stator winding in a direction which depends only on the polarity of the voltage of the source and the instantaneous position of the rotor.

17 Claims, 16 Drawing Sheets

DEVICE FOR CONTROLLING A SYNCHRONOUS ELECTRIC MOTOR WITH A PERMANENT MAGNET ROTOR

FIELD OF THE INVENTION

The present invention relates to a device for controlling the rotation of a synchronous electric motor. Specifically, the invention relates to a device comprising a stator including a winding disposed around a stack of laminations having a permanent magnet rotor associated therewith.

BACKGROUND OF THE INVENTION

In many applications, for example for driving fans for refrigeration systems, or pumps for domestic electric appliances, there is currently a tendency to replace the traditional asynchronous electric motors with electric motors of synchronous type having permanent magnets.

Synchronous electric motors of this type have better performance, with consequent energy saving, a greater constructional simplicity and lower weight, and consequently are of reduced cost.

Permanent magnet single phase synchronous motors have, however, starting problems due to the fact that the rotor has to be brought from stationary to rotation at a speed in general tied to the frequency of the alternating voltage of the supply network. If the supply source is the normal mains distribution network at 50 at 60 Hz the rotor of such a motor has to reach the synchronism speed in a half-period. This is particularly problematic when the starting resistance torque is not zero, and therefore the load which must be driven to rotate has a high inertia as in the case of an axial fan.

A further problem of single-phase synchronous motors is that the initial direction of rotation of the rotor is in general not pre-determined, that is to the say the motor is per se, not of a unidirectional starting type.

A further problematic aspect of the synchronous motor is represented by the fact that its speed of rotation under normal running conditions is strictly tied to the frequency of the supply voltage.

SUMMARY OF THE INVENTION

The object of the present invention is to provide a device for controlling the rotation of a synchronous electric motor with a permanent magnet rotor which will have a simple structure, which can be made economically, and which has a high operating reliability.

This and other objects are achieved according to the invention with a device comprising a stator including a winding disposed around a stack of laminations and with which is associated a permanent magnet rotor. Controlled conductor devices are connected to the stator winding and to an AC source. One or more position sensors determine the application to the control inputs of the said controlled conductor devices of electrical control signals having two states which vary as a function of the angular position of the rotor. The arrangement is such that the current is caused to flow in the stator winding in a direction which depends only on the polarity of the voltage of the source and the instantaneous position of the rotor.

BRIEF DESCRIPTION OF THE DRAWINGS

Further characteristics and advantages of the invention will be come apparent from the following detailed description, given purely by way of non-limitative example, with reference to the attached drawings, in which.

DETAILED DESCRIPTION OF THE INVENTION

Figure 1:
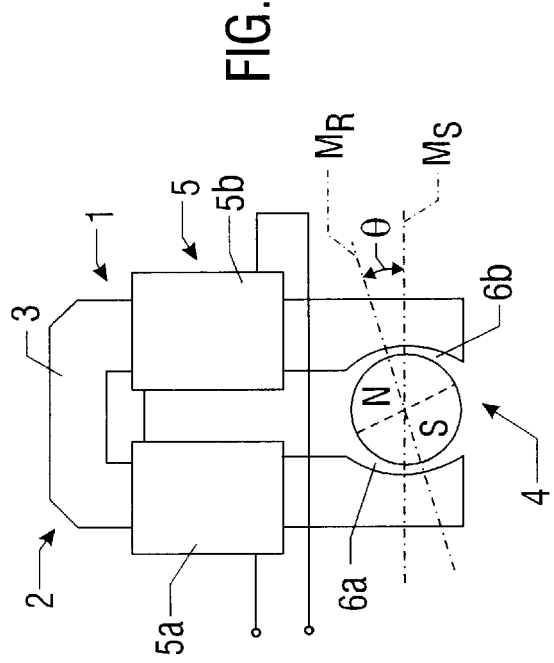
FIG. 1 shows a synchronous electric motor with a permanent magnet motor.

In FIG. 1 there is illustrated a single-phase synchronous electric motor generally indicated with the reference numeral 1. The stator 2 of this motor 1 comprises a stack 3 of substantially U-shape laminations between the ends of which is rotatably mounted a permanent magnet rotor 4. The stator 2 does not, however, necessarily have to have a U-shape form.

The stator 2 further includes a winding generally indicated 5 which in the exemplary embodiment illustrated is formed by two half-windings 5a and 5b connected together (in series or in parallel) wound on the two parallel arms of the lamination stack 3.

The distal ends of the two arms of the lamination stack 3 are shaped in such a way as to define, with respect to the rotor 4, an asymmetric air gap. In particular, this air gap comprises two interstices 6a and 6b of increasing width in the clockwise sense as seen in FIG. 1.

In the embodiment illustrated the rotor 4 has two counter posed magnetic poles indicated N and S.

Due to the effect of the shape of the air gap 6a, 6b the rotor 4 at rest is disposed with the magnetization axis MR inclined with respect to the axis MS of the pole pieces of the stator, forming an angle with respect thereto. At rest the rotor 4 can in particular be disposed in the position illustrated in FIG. 1, or in a position at 180° with respect to that illustrated.

Figure 2:
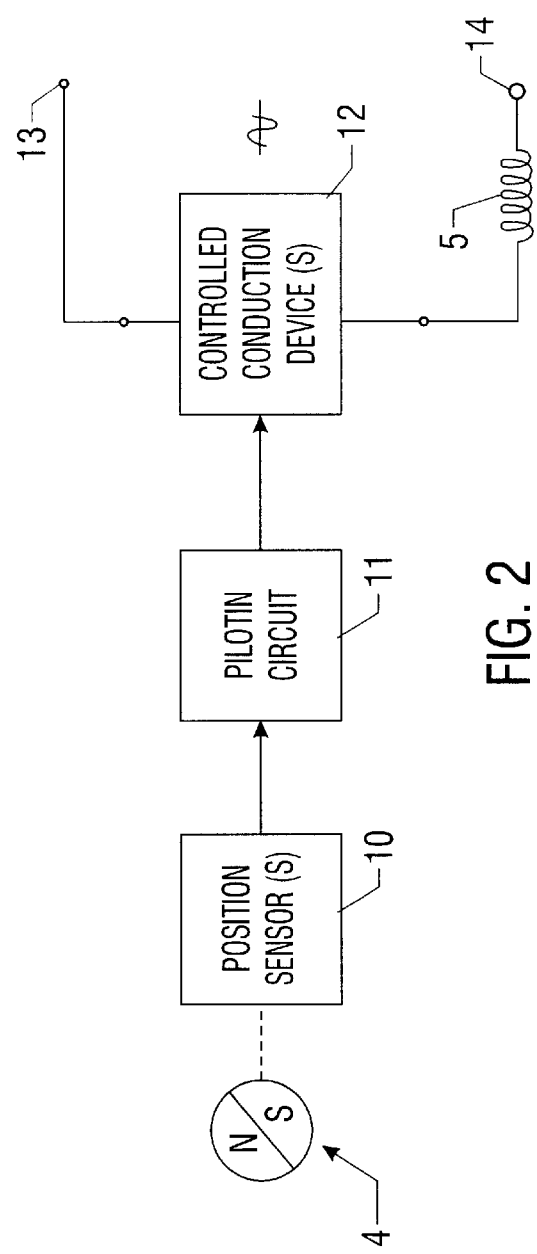
FIG. 2 is a block-schematic diagram of a control device according to the invention for a synchronous electric motor of the type illustrated in FIG. 1.

In FIG. 2 there is shown, in block diagram form, a device for controlling the rotation of a synchronous electric motor of the type described above with reference to FIG. 1.

In general this device comprises one or more position sensors 10 associated with the rotor 4 to provide, to a piloting circuit 11, electrical control signals of two states, which vary in dependence on the angular position of this rotor.

The output of the piloting circuit 11 is connected to one or more electronic controlled conduction devices 12, operable to allow current to flow selectively in the two senses in the stator winding 5 of the motor, and which are connected in series between two terminals 13 and 14 intended to be connected to an AC supply source such as the mains network.

The device schematically illustrated in FIG. 2 is such that a current is caused to flow in the stator winding 5 of the motor in a direction which depends only on the polarity of the voltage applied between the terminals 13 and 14 and the instantaneous position of the rotor 4.

Figure 3:
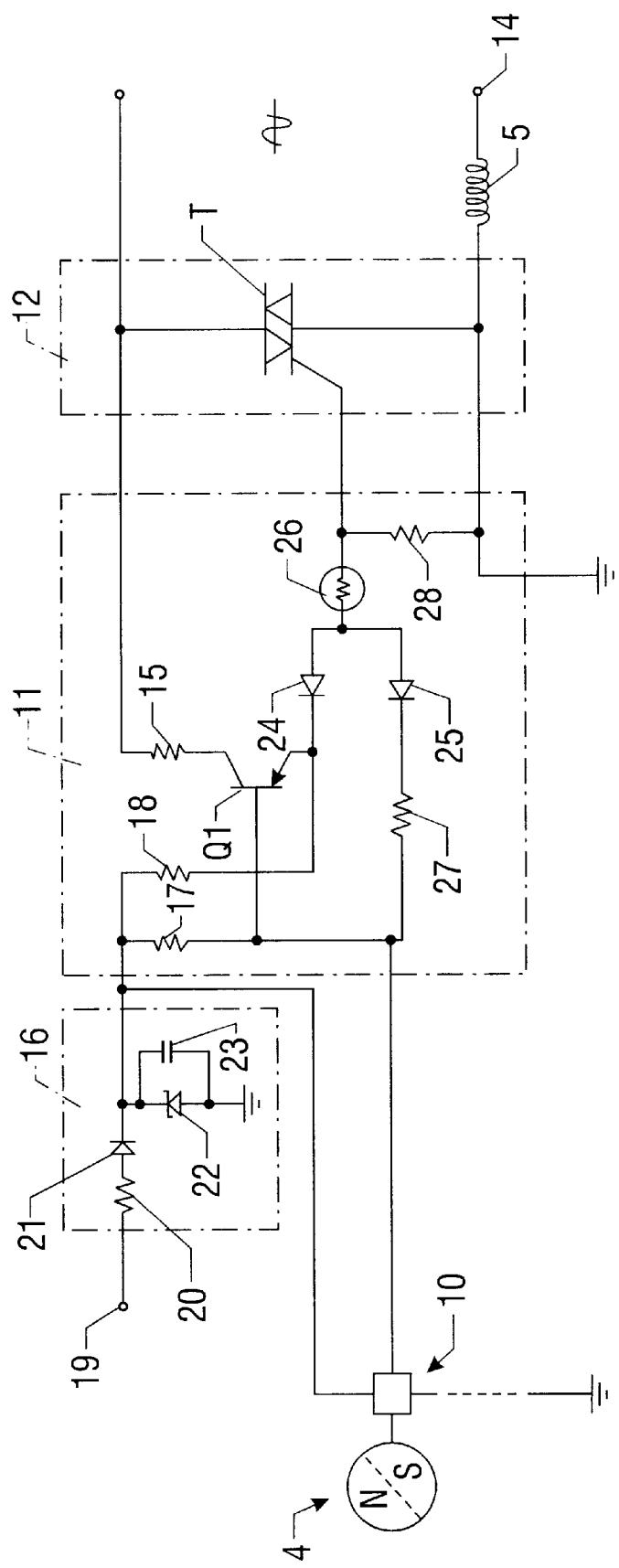
FIG. 3 is a detailed electric diagram of a first embodiment of a device according to the invention.

A first embodiment of this device according to FIG. 2 is illustrated in FIG. 3.

In this embodiment the rotor 4 of the motor is associated with a Hall-effect sensor 10. The conduction of current in the stator winding 5 is controlled by means of a Triac T, connected in series with this winding between the supply terminals 13 and 14.

The piloting circuit 11 of FIG. 3 comprises a transistor Q1 which in the embodiment illustrated is of pnp type and the base of which is connected to the output of the sensor 10. The collector of Q1 is connected to the terminal 13 by means of a resistor 15. The base and the emitter of Q1 are connected to the output of a DC voltage supply circuit 16 by means of respective resistors 17 and 18.

The supply circuit 16 has an input terminal 19 intended to receive an alternating voltage, preferably a reduced voltage with respect to that applied between the terminals 13 and 14. This supply circuit comprises for example a resistor 20 followed by a rectifier diode 21, a stabilizer (Zener) diode 22 and a leveling capacitor 23.

The piloting circuit 11 further includes two diodes 24 and 25 having their anodes and cathodes connected respectively to the gate of the Triac T by means of a PTC resistor 26. The cathode of the diode 24 is connected to the emitter of the transistor Q1. The anode of the diode 25 is connected to the output of the sensor 10 via a resistor 27. A resistor 28 is connected between the gate of the Triac T and ground.

The device of FIG. 3 acts in a manner which will now be described by making reference also to the graphs of FIGS. 4a and 4b in which VM represents the supply voltage applied between the terminals 13 and 14, H indicates the signal provided at the output from the sensor 10, I indicates the current flowing in the stator winding 5 of the motor, and CEMF indicates the back-electromotive force developed in the motor.

Figure 4A:
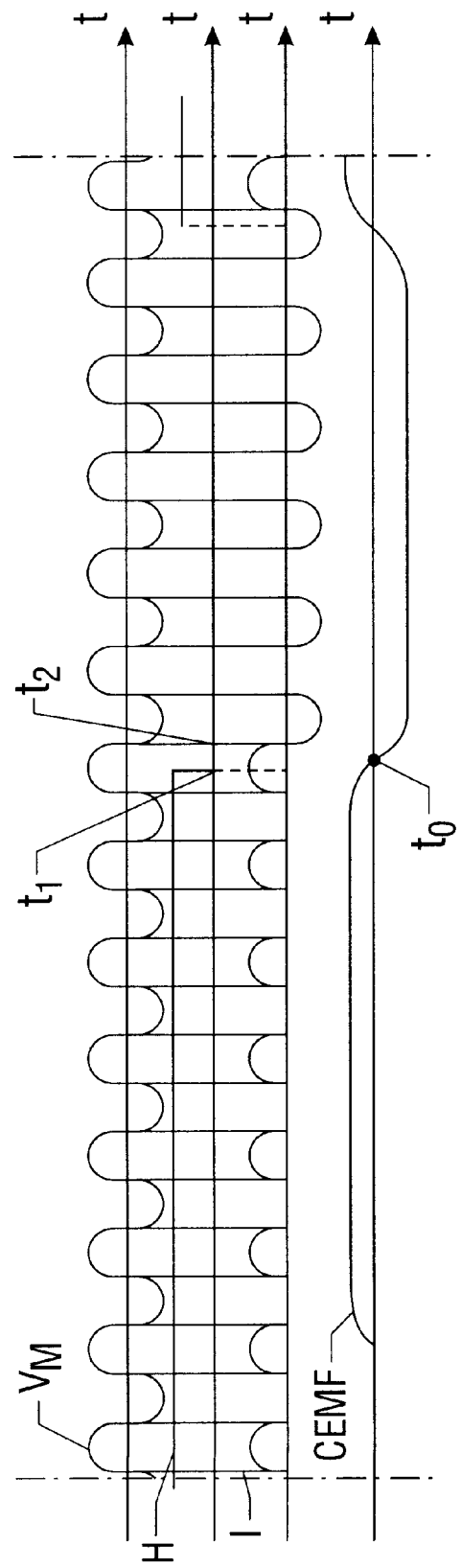
FIGS. 4a and 4b are timing diagrams of signals and other quantities in the device of FIG. 3, respectively in the starting phase and in the normal running condition.
Figure 4B:
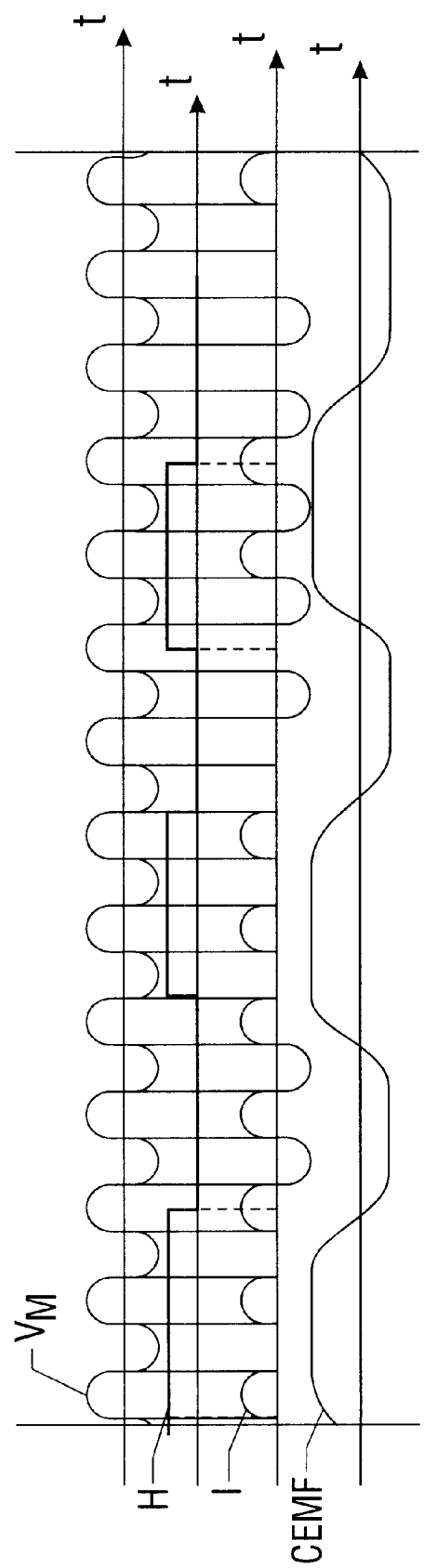

The graphs of FIG. 4a show the variations of VM, H, I and CEMF in the starting phase, that is to say in the starting transient of rotation of the rotor, whilst the graphs of FIG. 4b show the variation of the same quantities in the normal running conditions.

When the output signal from the Hall-effect sensor 10 is at high level ("1"), the transistor Q1 is switched off and a current flows in towards the gate of the Triac T. Therefore, as long as the output of the sensor 10 is at high level, the Triac T allows only the positive half-waves of the supply current to flow through the stator winding 5, as is shown by the lines representing the current I illustrated in FIGS. 4a and 4b. The Triac T operates in the first quadrant of the voltage-current plane.

When, upon rotation of the rotor 4, the output of the sensor 10 passes to low level ("0"), the transistor Q1 passes into conduction. A current flows out from the gate of the Triac T, which therefore operates I the third quadrant, allowing only the negative half-waves of the current to flow in the stator winding 5 of the motor.

If the transition from high level to low level of the signal H provided by the sensor 10 occurs in correspondence with a positive half-wave of the supply voltage VM, as is shown at the instance t1 in FIG. 4a, the current in the stator winding 5 does not immediately invert, but rather does this upon subsequent passage through the voltage VM, as is shown at instant t2 in the said figures.

Still with reference to FIG. 4a, up to the instant t0 the back-electromotive force CBMF and the current I are both positive so that a positive driving torque develops in the motor. Between the instants t0 and t2 the current I in the motor is still positive, but the back-electromotive force CEMF is negative so that in this short interval a negative torque develops. After the instant t2, the current I and the back-electromotive force CEMF are both negative and a positive torque again develops. Similar situations can arise when the signal H at the output of the sensor 10 passes from low level to high level.

The possibility that a negative torque is generated for a short time interval represents, however, an inconvenience of practically negligible magnitude. Moreover, the signal H does not always pass from high to low level (and vice versa) in coincidence with a positive (or negative) half-wave of the supply voltage.

Figure 5:
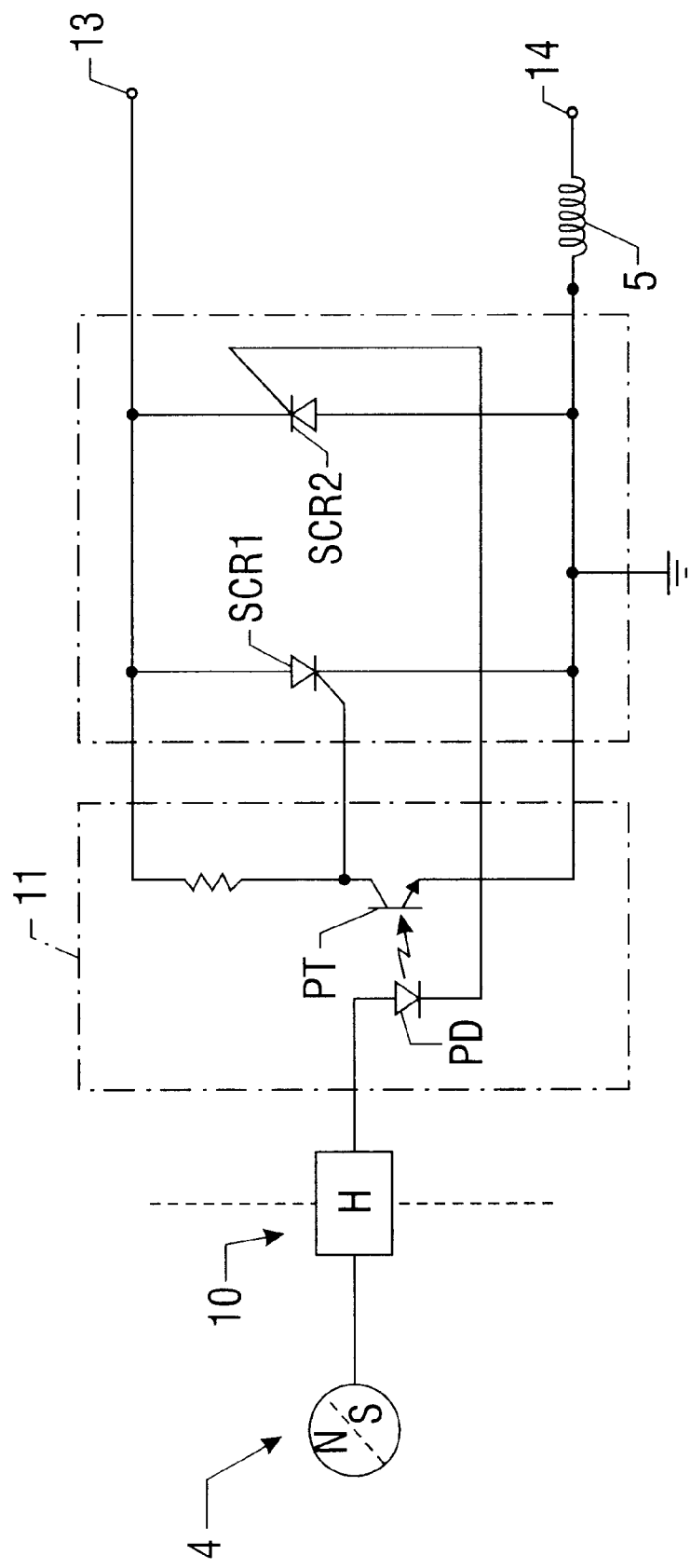
FIGS. 5 and 6 are electric diagrams of two variant embodiments of the device according to the invention.

In FIG. 5 there is shown a further variant of the device according to the invention, in which in place of a Triac there are utilized two controlled rectifiers SCR1 and SCR2 disposed in antiparallel with one another in series with the stator winding 5. The piloting circuit 11 comprises a photodiode PD the anode of which is connected to the output of the sensor 10, in this case also constituted for example by a Hall-effect sensor, and the cathode of which is connected to the gate of one of the two SCRs and coupled optically to a phototransistor PT the collector of which is connected to the gate of the other SCR.

With this arrangement the two SCRs are piloted in counter-phase by the output of the sensor 10, one by means of the photodiode PD and the other by means of the phototransistor PT which acts as an inverter.

Figure 6:
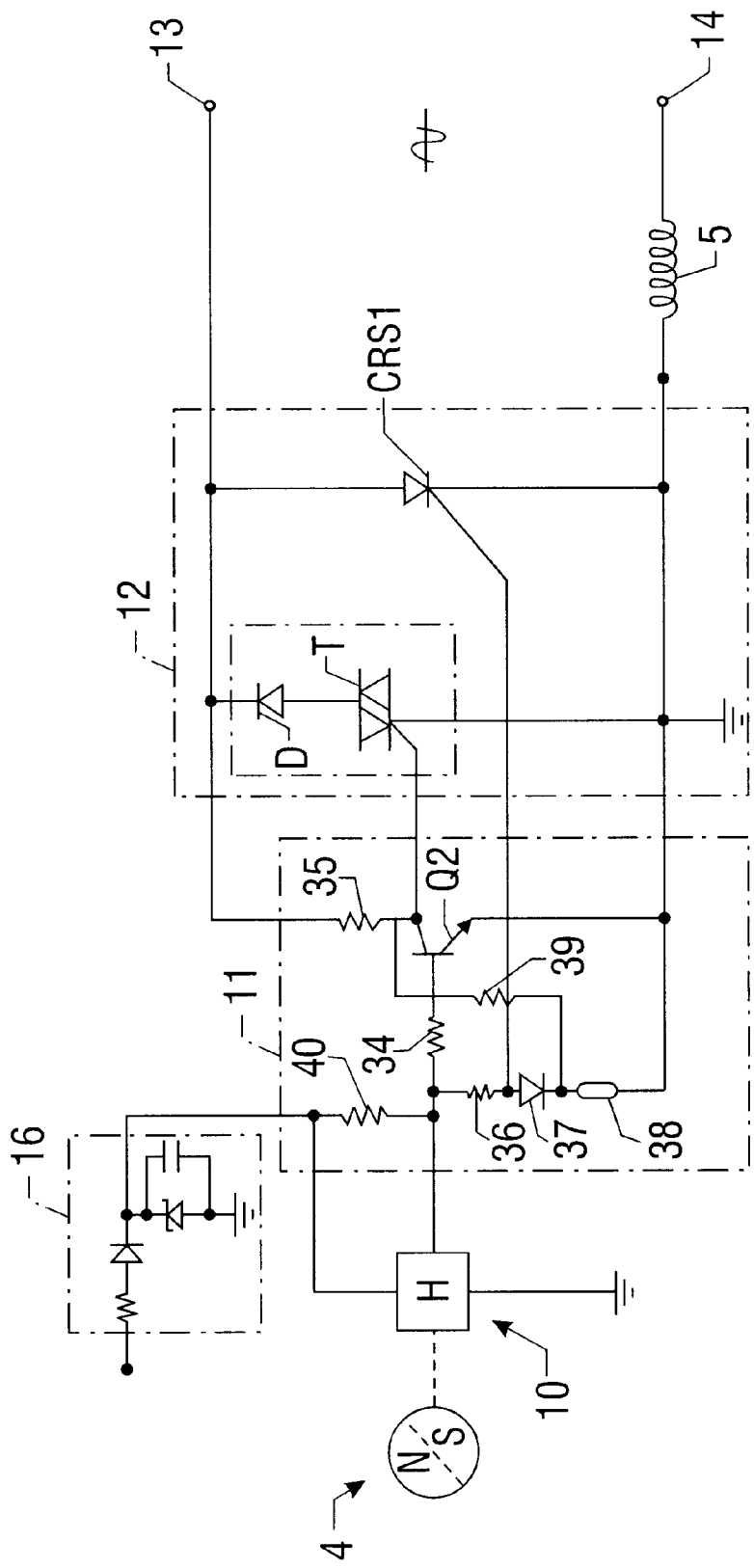

In the variant of FIG. 6 the bi-directional controlled conductor means 12 comprise a controlled rectifier diode SCR1 in parallel with which a Triac T and a diode D are disposed in series in such a way as to allow the passage of current in the opposite sense from that of the current in the controlled diode SCR1.

The piloting circuit 11 is shown by way of example in FIG. 6 comprises a transistor Q2 of npn type the base of which is connected to the output of the (Hall-effect) sensor 10 via a resistor 34, the emitter of which is connected to ground, and the collector of which is connected to the gate of the Triac T and to the cathode of the diode D via a resistor 35. The output from the sensor 10 is connected to the gate of SCR1 via a resistor 36. The anode of a diode 37 is connected to the gate of SCR1 and its cathode is connected to ground via a thermal protection resistor 38 of NTC type. A resistor 39 is connected between the cathode of the diode 37 and the collector of the transistor Q2. A DC supply circuit 16 provides for the supply of the sensor 10 and biasing of the base of the transistor Q2 via a resistor 40.

The operation of the device illustrated in FIG. 6 is similar to that of the device illustrated in FIG. 5: the controlled diode SCR1 is piloted directly by the output of the sensor 10 via the resistor 36, whilst the gate of the Triac T is piloted by the signal from the sensor 10 inverted by the transistor Q2.

Figure 7:
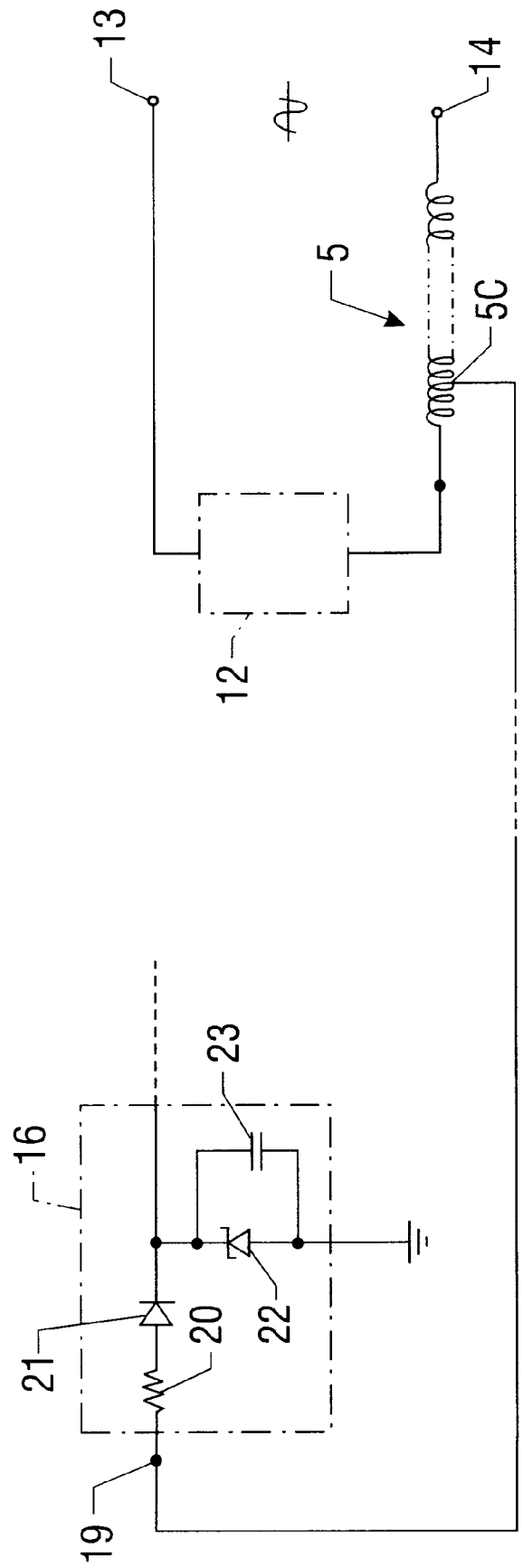
FIG. 7 is a diagram which shows a variant embodiment of a power supply circuit included in a device according to the invention.

In the various embodiments described above, as in some of those which will be described hereinafter, the generation of the DC supply voltage necessary for the sensor 10 associated with the rotor, and possibly for the biasing of other components, can conveniently be achieved by adopting the arrangement which will now be described with reference to FIG. 7.

In this Figure a rectifier/stabilizer circuit is generally indicated 16, the input 19 to which is connected to an intermediate tap 5c of the stator winding 5. The arrangement makes it possible particularly to contain the resistance value of the input resistor 20 of the supply circuit 16. The intermediate tap 5c is positioned in such a way as to allow a fraction of the supply voltage applied across the terminals 13 and 14 to be taken off.

Figure 8A:
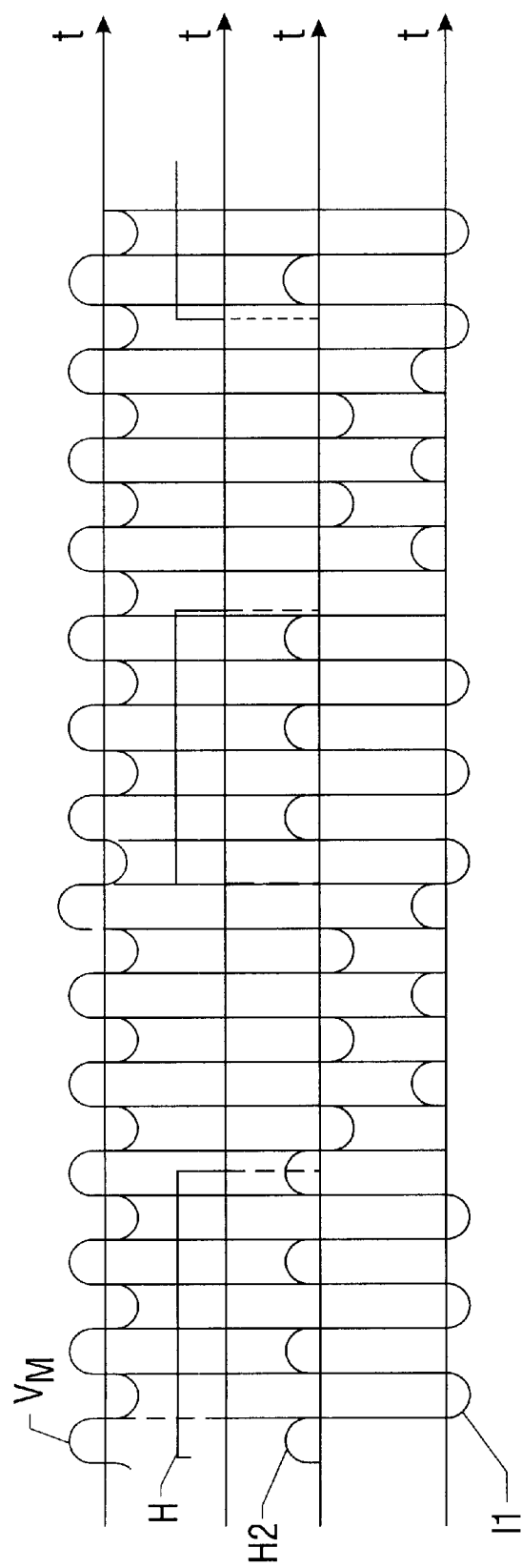
FIG. 8a is a timing diagram of signals present in operation of the device of FIG. 8.
Figure 8B:
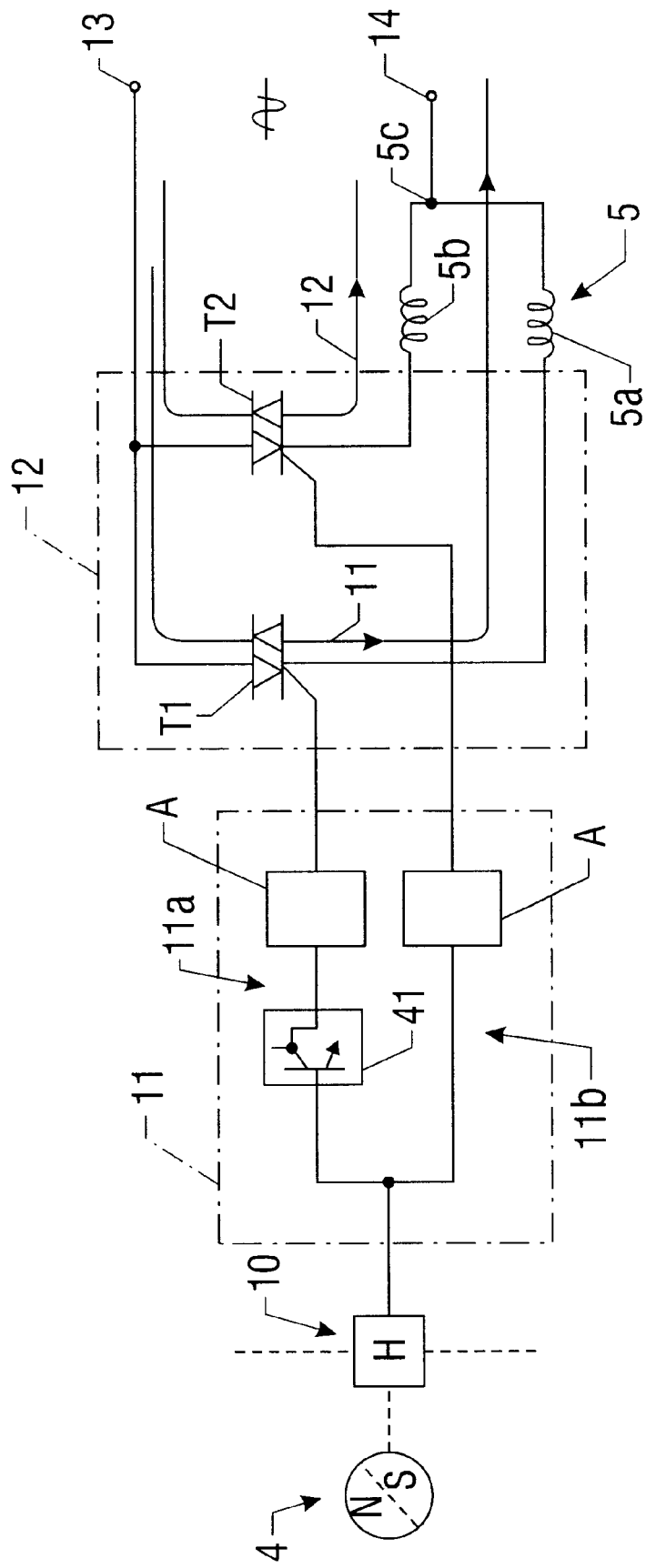
FIG. 8 is an electrical diagram of a further variant embodiment of a device according to the invention.

In FIG. 8 is illustrated a further variant of a device according to the invention. In this embodiment the stator winding 5 is divided into two half-winding 5a and 5b with a central tap 5c connected to the supply terminal 14. In series with the half-windings 5a and 5b are connected respective Triacs T1 and T2. These Triacs have respective upper terminals connected to the supply terminal 13.

The sensor 10 associated with the rotor 4 of the motor may also be for example a Hall-effect sensor the output of which is coupled to the gates of T1 and T2 via two circuit branches 11a and 11b of the piloting circuit 11, each comprising the same circuitry A in advance of which, in the branch 11a only, is positioned a logic inverter stage 41. The circuitry A in each of the branches of the piloting circuit 11 may have for example the structure of the circuit generally indicated 11 in FIG. 3.

The two half-windings 5a and 5b of the rotor winding are wound in opposite senses.

The device of FIG. 8 operates in a manner which will now be described with reference to the signals the timing diagram of which are shown in FIG. 8a.

In FIG. 8a VM indicates the alternating supply voltage applied in operation between the terminals 13 and 14, H indicates an output signal from the sensor 10 associated with the rotor 4 of the motor. I2 and I1 indicate the currents flowing in the Triacs T1 and T2 (see also FIG. 8).

When the output from the sensor 10 is at high level the Triac T2 a current I2 constituted by the positive half-wave of the supply current, to flow in the half-winding 5b. At the same time the Triac T1 causes a current I1, corresponding to the negative half-wave of the supply current, to flow through the half-winding 5a.

Conversely, when the signal H at the output from the sensor 10 is at low level, the current I2 flowing in the half-winding 5b is constituted by the negative half-wave of the supply current whilst the current I1 flowing in the half-winding 5a is constituted by the positive half-wave of the same supply current.

Since the half-windings 5a and 5b are wound in opposite senses, the magnetic fluxes produced by the currents circulating in them are in concordance and sum, substantially as if these half-windings were wound in the same sense and had currents flowing in the same direction.

With the above-illustrated arrangement both the positive half-waves and the negative half-waves of the supply current are successfully exploited for the purposes of generating torque.

The various variant embodiments described up to now comprise a single position sensor associated with the rotor 5 of the synchronous motor and are affected by the (modest) disadvantage represented by the fact that the generation of negative torque can be generated for a brief time interval when the passage of the sensor output from low (high) level takes place in correspondence with a positive (negative) half-wave of the supply voltage.

This disadvantage can be eliminated with the variant embodiments which will now be described with reference to FIG. 9 and thereafter, in which in general two sensors are utilized for detecting the position of the rotor 4 of the motor.

Figure 9:
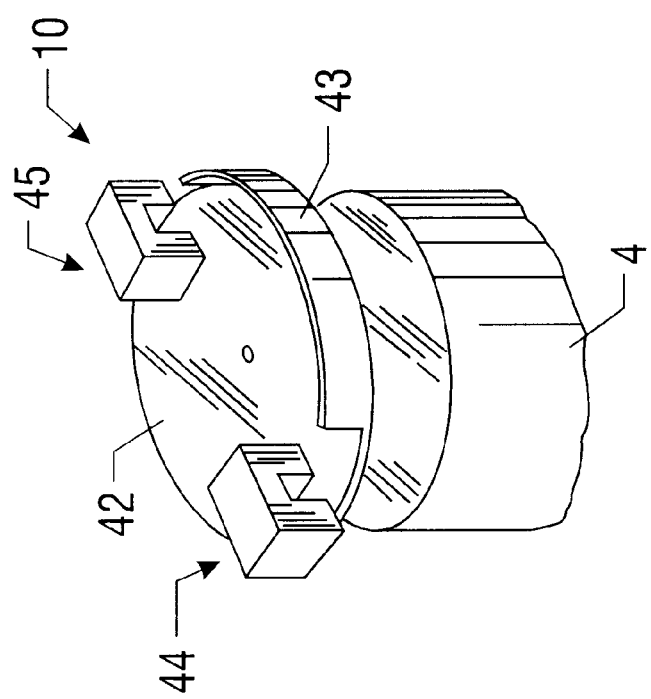
FIG. 9 is a partial perspective view which shows one way of forming position sensor devices associated with the rotor of a synchronous motor.

With reference to FIG. 9, in a first embodiment the rotor 4 of the motor is associated with a member 42 rotatably fixed with it. This member has for example the form of disc and has an opaque peripheral arcuate sector 43 extending over a predetermined angular extent. The reference numerals 44 and 45 indicate two photodiode-photo transistor pairs disposed in respective positions fixed along the circular path of the opaque sector 43. This sector can pass between the photodiode and the phototransistor of each of these pairs during its rotating motion together with the rotor 4. When the rotor 4 of the motor rotates, the signals correspondingly provided by the phototransistors of the devices 44 and 45 exhibit a behavior of the type illustrated in FIG. 10a. If the devices 44 and 45 are disposed at 180 degrees with respect to one another the signals P1 and P2 provided by respective phototransistor are phase-displaced by 180 degrees. Each of these signals is at high level for a time period corresponding to the angular extent of the opaque sector 43.

Figure 10:
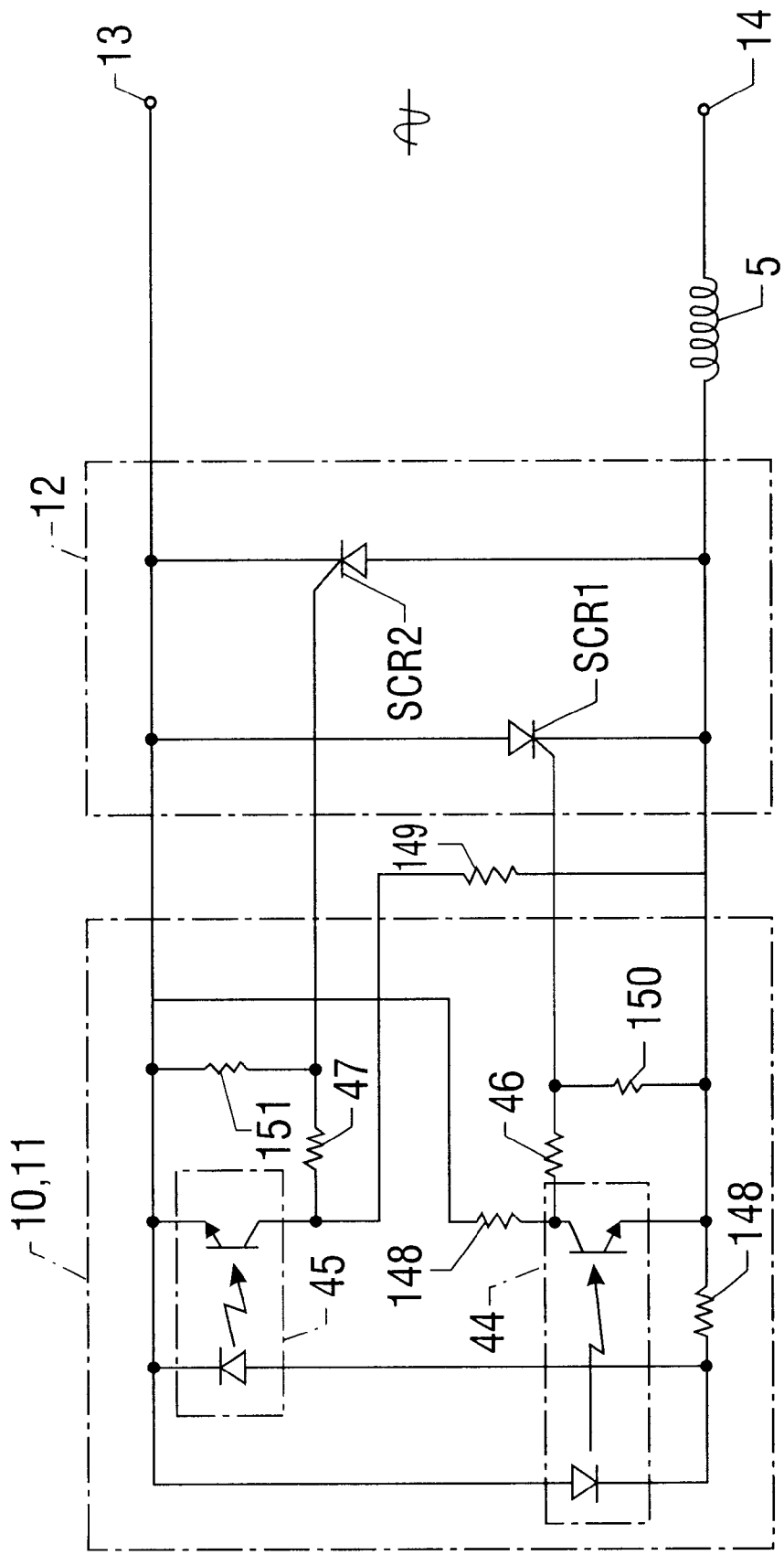
FIG. 10 is a diagram of a further variant embodiment of a device according to the invention.

FIG. 10 shows a first embodiment of a motor control; device utilizing the rotor position detection system shown in FIG. 9.

In the device according to FIG. 10, the controlled bi-directional conduction means 12 comprise two controlled rectifier diodes SCR1 and SCR2 disposed in antiparallel in series with the stator winding 5. The gates of SCR1 and SCR2 are piloted by the phototransistors of the photo-couplers 44 and 45 respectively.

The opaque sector 43 associated with the photo-couplers 44 and 45 of the device of FIG. 10 has an angular extent selected as a function of the desired running speed for the electric motor. This angular extent lies in particular between a minimum value corresponding to the condition that the torque generated should always be positive and a maximum value corresponding to the condition that the average torque generated should be positive.

In the device of FIG. 10 the photodiodes of the photo-couplers 44 and 45 are connected in antiparallel with one another, in series with a resistor 148, and in parallel with the controlled diodes SCR1 and SCR2. The resistor 148 (which, however, is not essential) allows the current in the photo-diodes to be conveniently limited in the case of mechanical jamming of the rotor 4 of the motor.

The collectors of the phototransistors of the photo-couplers 44 and 45 can conveniently be connected to the gates of the corresponding controlled diodes SCR1 and SCR2 by means of resistors 46 and 47 so that when each of these phototransistors becomes conductive its collector-emitter voltage does not exceed the gate-cathode voltage of the associated controlled diode.

The collector of the phototransistor of the photo coupler 45 is connected to the emitter of the phototransistor of the photo coupler 44 through a resistor 149. Similarly, a resistor 149a interconnects the collector of the phototransistor of the photo coupler 44 of the emitter of the photo coupler 45.

Two resistors 150 and 151 are connected essentially in parallel to the collector-emitter path of the two photo-couplers 44 and 45. The resistor 150 and 151, the presence of which is not strictly necessary, are convenient to ensure the extinction of the SCR in all likely operating temperature ranges.

Figure 11:
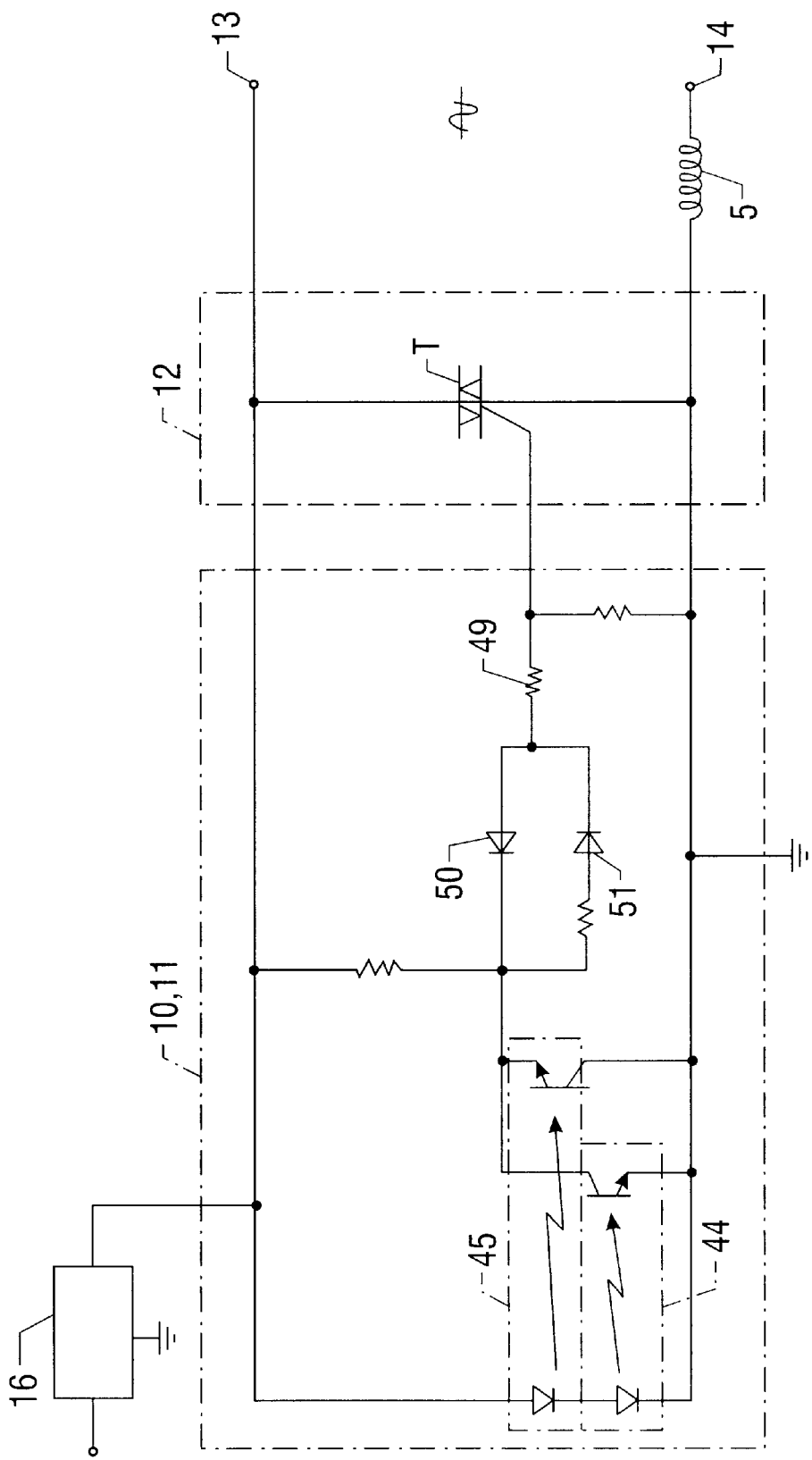
FIG. 11 shows a further variant embodiment of the device according to the invention.

In the variant embodiment in FIG. 11 the current in the stator winding 5 is controlled via a single Triac T the gate of which is connected to the output of two photo-couplers 44 and 45 via a resister 49 disposed in series with two circuit branches including respective diodes 50 and 51 disposed in opposite sense. The photodiodes of the photo-couplers are connected in series with one another in parallel with the Triac T. The phototransistors of the photo-couplers 44 and 45 are of npn type with respective collector-emitter paths in antiparallel with one another.

The variant embodiment of FIG. 11 operates in a similar manner to that of the device previously described with reference to FIG. 10.

Figure 12:
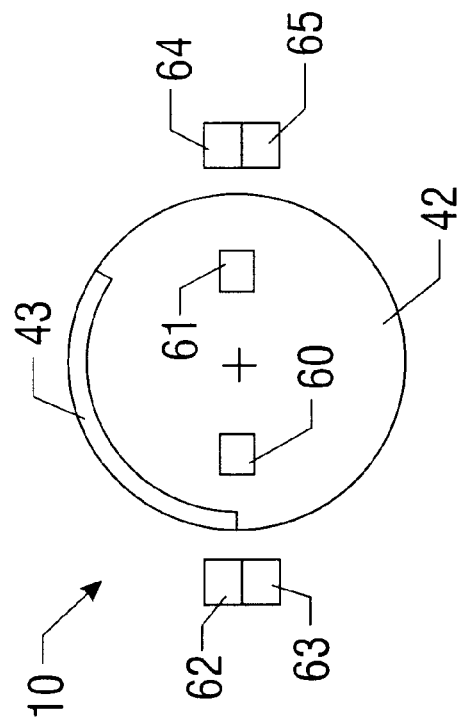
FIG. 12 is a view from above of a sensor device for detecting the position of the rotor in a synchronous motor.

In FIG. 12 there is shown a variant embodiment of the system for detecting the angular position of the rotor 4 of the motor. In this variant the rotor 4 is associated with the member 42 rotatable fixedly with it and provided with an opaque peripheral arcuate sector 43 the angular extent of which is predetermined on the basis of the criteria described above. This sector can intercept the radiation emitted by two photodiodes 60 and 61 disposed in fixed positions at 180 degrees with respect to one another across the axis of rotation of the rotor. Facing the photodiodes 60 and 61 are two pairs of phototransistors 62, 63 and 64, 65 respectively. The arrangement is such that the opaque sector 43 of the member 42 can, by the effect of the rotation of the rotor 4, cyclically intercept the radiation fro the photodiodes 60 and 61 to the associated transistor 62, 63 and 65, 65.

Figure 10A:
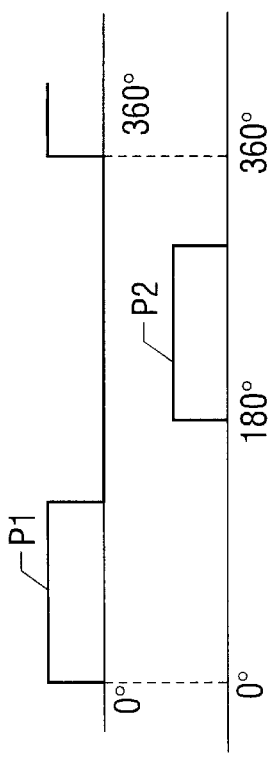
FIG. 10a illustrates the signals provided by the position sensors of FIG. 9.

The corresponding output signals provided by the phototransistors 62, 63 and 64, 65 respectively have variations corresponding to those of the signals of P1 and P2 of FIG. 10a.

Figure 13:
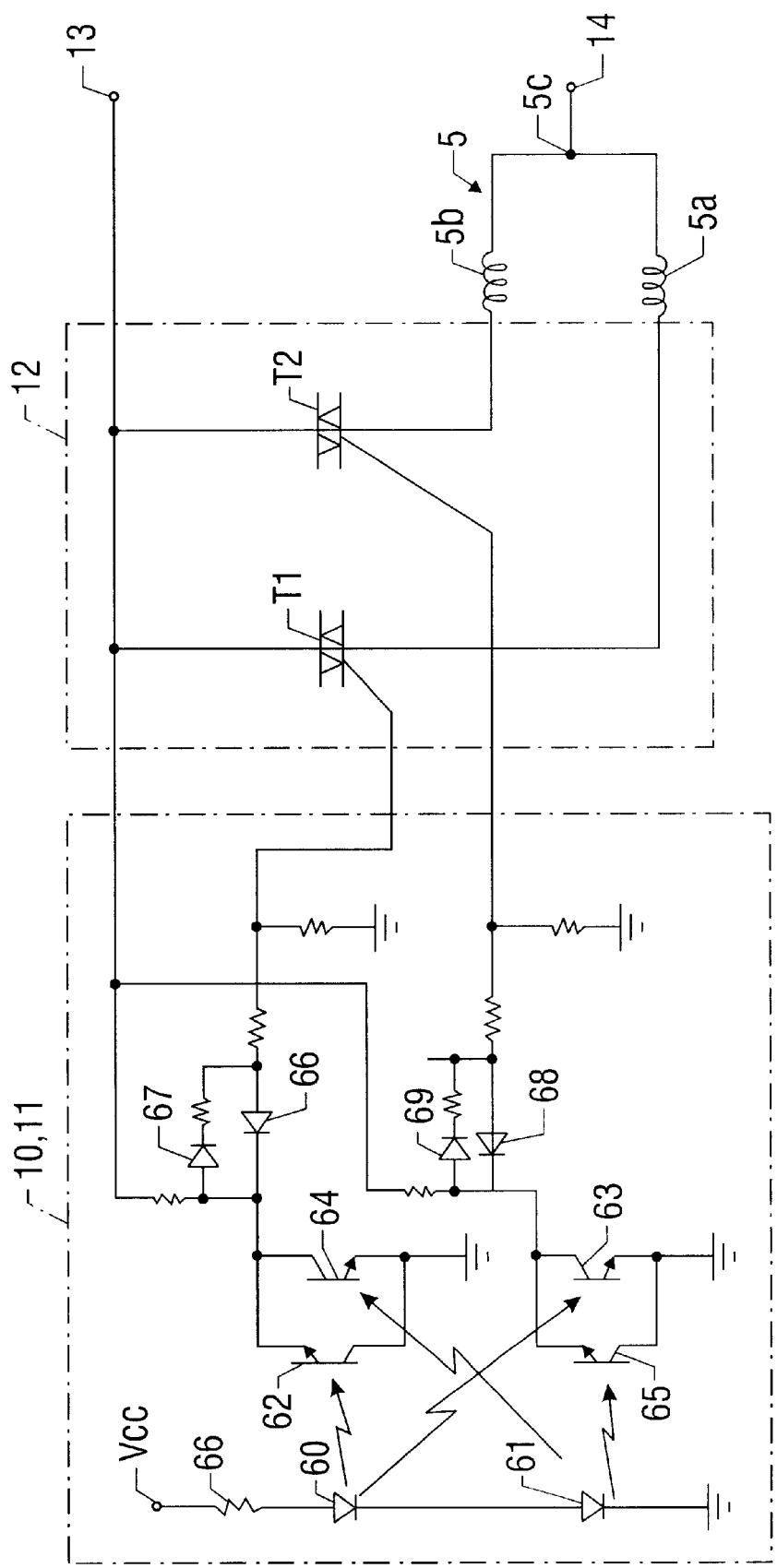
FIG. 13 shows a variant embodiment of the device of the invention.

FIG. 13 is a diagram of a device according to the invention utilizing the rotor position detection system described above with reference to FIG. 12.

As is seen in FIG. 13, the photodiodes 60 and 61 are disposed in series with one another and a resistor 66 between the terminals of a DC supply source VCC.

The phototransistors 62 and 63 associated with the photodiodes 60 are of npn type and are connected in antiparallel with the phototransistors 64 and 65 respectively associated with the photodiodes 61.

The outputs of the phototransistors 62 and 64 are coupled to the gate of the Triac T1 disposed in series with a half-winding 5a of the stator winding 5. Similarly, the outputs of the phototransistors 63 and 65 are coupled to the gate of a second Triac T2 connected in series with the other half-winding 5b of the stator winding 5.

The central tap 5c of the winding 5 is connected to the supply terminal 14.

Between the outputs of the phototransistors 62, 64 (63, 65) and the gate of the Triac T1 (T2) are interposed to diodes 67a, 67 (68, 69) disposed substantially in antiparallel with one another.

The variant of FIG. 13 operates in a substantially similar manner to that of the device shown in FIG. 8.

Two Hall-effect sensors disposed in respective fixed positions angularly offset from one another can be used for detection of the angular position of the rotor 4, in place of pairs of photodiodes and associated phototransistors. A combinatorial logic circuit connected to the outputs of the sensors makes it possible to make available at the output piloting signals similar to those obtainable with two photodiodes and associated phototransistors, that is to say similar to the signals previously described with reference to FIG. 10a.

Figure 14A:
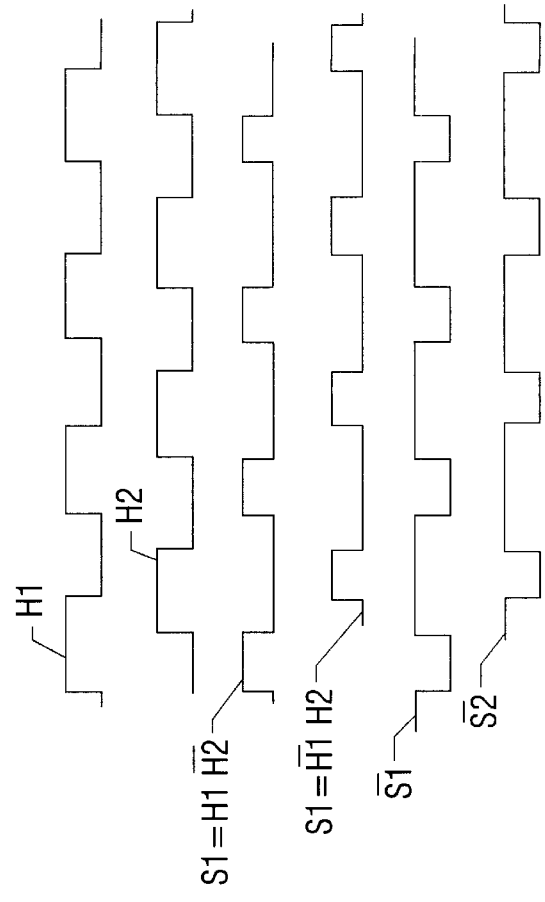
FIG. 14a shows a series of signals generated in operation of the circuit of FIG. 14.
Figure 14:
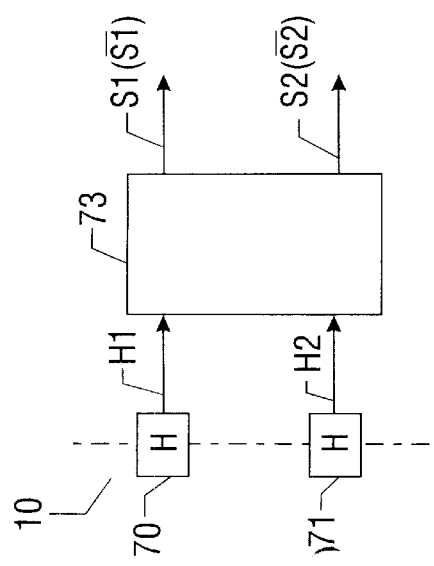
FIG. 14 is a diagram of a circuit for generating signals indicative of the position of the rotor of a synchronous motor.

In FIG. 14 there is shown such a device with two Hall-effect sensors 70, 71 the outputs of which are connected to a combinatorial logic circuit 73. This logic circuit is arranged to process the signals H1 and H2 provided by the sensors 70 and 71, for example in the manner which will now be illustrated with reference to FIG. 14a.

In this Figure there are shown timing diagrams of the signals H1 and H2 which are spaced in time as a consequence of the angular separation of the positions of the sensors 70 and 71.

The logic circuit 73 is arranged to generate a first signal S1=H1 H2 and a second S2–H1 H2 the timing diagrams of which are shown in FIG. 14a.

The signals S1 and S2 are similar to the signal P1 and P2 which can be obtained from the two photo-couplers are shown in FIG. 10a. The duration of the high level portions of the signals S1 to S2 depends on the relative angular position of the sensors 70 and 71. The relative angular position of the sensors can be selected in such a way that the durations of the high level portions of the signals S1 and S2 are such that there is no longer any generation of negative torque or, at least, that the average torque is always positive.

According to the characteristics of the piloting circuit utilized for controlling the current in the stator winding of the motor, the logic circuit 73 can be arranged to provide output signals S1 and S2 or inverted signals S1 and S2.

Figure 15:
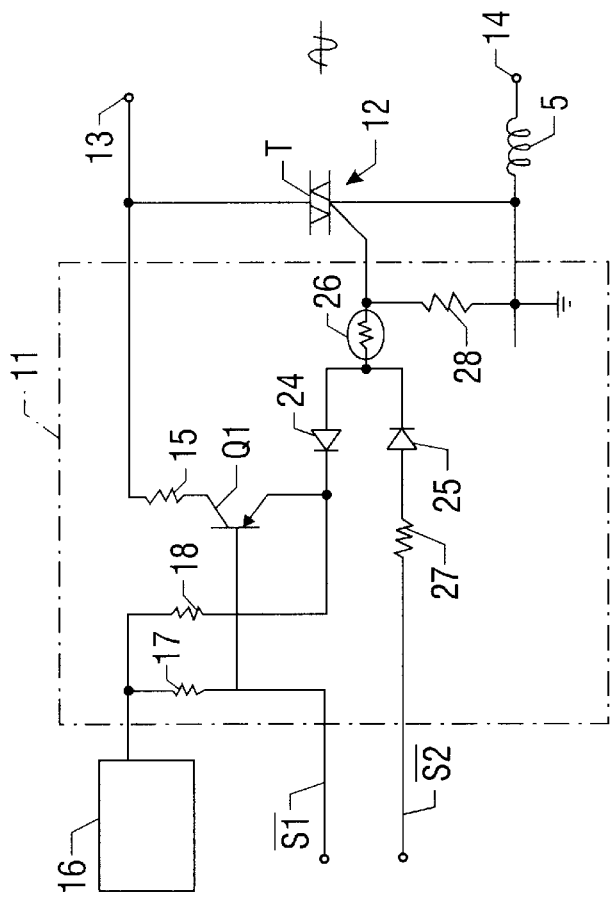
FIGS. 15 and 16 are diagrams of two further variant embodiments of a device according to the invention.

In FIG. 15 there is shown a control device according to the invention piloted with the signals S1 and S2 described above. The device of FIG. 15 comprises a piloting circuit 11 the structure of which is practically identical to that of the piloting circuit 11 shown in FIG. 3, with respect to which it differs essentially by the fact that the base of the transistor Q1 receives the signal S1 whilst the signal S2 is applied (by other resistor 27) to the anode of the diode 25.

Figure 16:
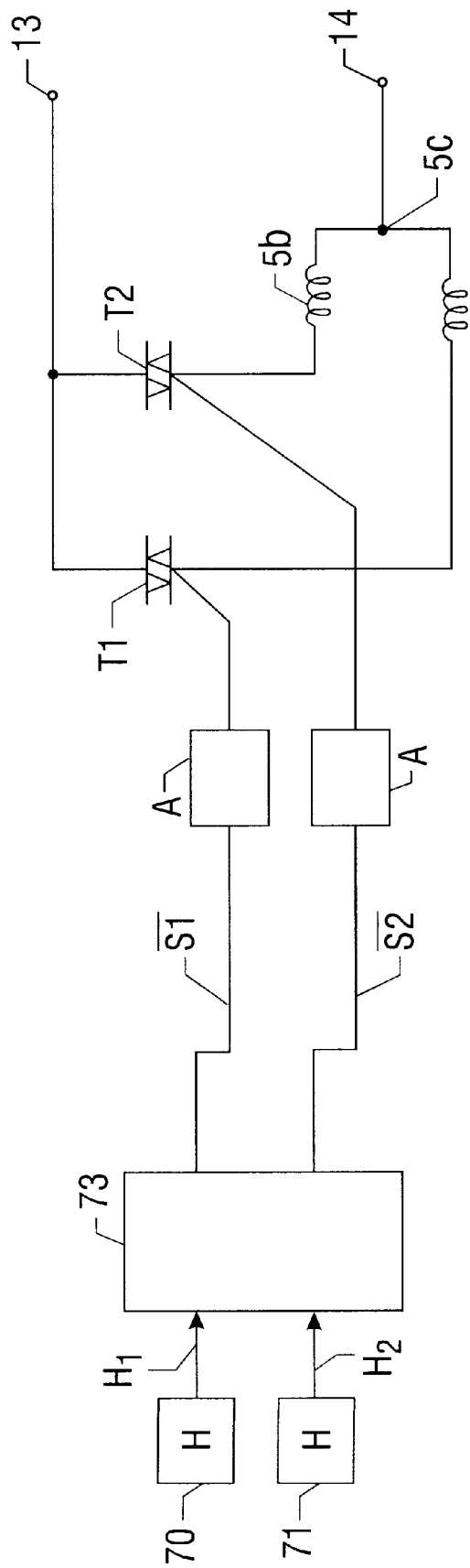

In FIG. 16 there is illustrated a further variant embodiment of the device according to the invention structurally similar to that previously described with reference to FIG. 8, but utilizing the signals S1, S2, S1 and S2 provided by the logic circuit 73 of FIG. 14. The piloting circuit 11 of the device according to FIG. 16 comprises two circuits A identical to one another having for example the same circuit structure 11 as FIG. 3 and the outputs of which are connected to the gates of two Triacs T1 and T2 connected in series to the half-winding 5a and 5b of the stator winding 5.

To the inputs of the two circuits A are applied, respectively, the signals S1 and S2 and S1 respectively.

The control device according to the invention can be used for starting a synchronous motor with high inertia for the purpose of bringing it to the synchronism speed.

It further allows, via a suitable dimensioning of the stator winding, a synchronous motor to be operated at a different speed with the synchronism speed corresponding to the frequency of the alternating supply voltage.

Naturally, the principle of the invention remaining the same, the embodiments and details of construction can be widely varied with respect to what has been described and illustrated purely by way of non-limitative example, without by this departing from the ambit of the invention as defined in the attached claims.

What is claimed is:

1. A circuit for controlling the rotation of a synchronous electric motor comprising a stator including a winding disposed around a stack of laminations and having an associated permanent magnet rotor, the circuit comprising:
   controlled conductor means having control inputs, the controlled conductor means being connected to the stator winding and to an AC source;
   position sensor means operable to determine the application to the control inputs of the controlled conductor means of electrical control signals of two states which vary as a function of the annular position of the rotor;
   a piloting circuit connected in between the position sensor means and the controlled conductor means, wherein the position sensor means provide the electrical control signals of two states to the piloting circuit;
   wherein the controlled conductor means comprise a Triac disposed in series with the stator winding between two terminals connectable to the AC source and the gate of which is coupled to the position sensor means via the piloting circuit connected to a DC voltage source, the piloting circuit being arranged to allow a current to flow into or out from the gate of the Triac in dependence on the state of the signal provided at the output from the position sensor means;
   wherein the piloting circuit comprises: a transistor the base of which is connected to the position sensor means and the collector-emitter path of which is connected to the gate of Triac via a first diode operable to allow current to flow out from the gate, and a second diode disposed between the output of the position sensor means and the gate of the Triac operable to allow current to flow into the gate, the DC voltage source being connected to the base of the transistor and to the anode of the second diode; and
   wherein the circuit is operable to cause the current to flow in the stator winding in a direction which depends only on the polarity of the voltage of the source and the instantaneous position of the rotor.

2. A circuit for controlling the rotation of a synchronous electric motor comprising a stator including a winding disposed around a stack of laminations and having an associated permanent magnet rotor, the circuit comprising:
   controlled conductor means having control inputs, the controlled conductor means being connected to the stator winding and to an AC source;
   position sensor means operable to determine the application to the control inputs of the controlled conductor means of electrical control signals of two states which vary as a function of the angular position of the rotor;
   a piloting circuit connected in between the position sensor means and the controlled conductor means, wherein the position sensor means provide the electrical control signals of two states to the piloting circuit;
   wherein the controlled conductor means comprise two controlled rectifiers disposed in antiparallel with one another and in series with the stator winding between the terminals connectable to the AC source, the control inputs of the controlled conductor means being the control inputs of the rectifiers and coupled to the position sensor means via the piloting circuit operable to apply to them a logic control signal corresponding to the signal of the position sensor means and the inverse of this signal respectively; and
   wherein the circuit is operable to cause the current to flow in the stator winding in a direction which depends only on the polarity of the voltage of the source and the instantaneous position of the rotor.

3. A circuit according to claim 2, in which the piloting circuit 11 comprises a photodiode connected between the position sensor means and a control input of a controlled rectifier, and a phototransistor optically coupled to the photodiode and the output of which is connected to the control input of the other controlled rectifier.

4. A circuit according to claim 2, in which a controlled rectifier comprises a Triac and a diode connected in series.

5. A circuit according to claim 4 in which the piloting circuit comprises a transistor the base of which is connected to the position sensor means and the collector of which is connected to the gate of the Triac, and a non-inverting connection between the output of the position sensor means and the control input of the other controlled rectifier.

6. A device for controlling the rotation of a synchronous electric motor comprising a stator including a winding disposed around a stack of laminations and having an associated permanent magnet rotor, the circuit comprising:

controlled conductor means having control inputs, the controlled conductor means being connected to the stator winding and to an AC source;

position sensor means operable to determine the application to the control inputs of the controlled conductor means of electrical control signals of two states which vary as a function of the angular position of the rotor;

a piloting circuit connected in between the position sensor means and the controlled conductor means, wherein the position sensor means provide the electrical control signals of two states to the piloting circuit;

wherein the controlled conductor means comprise a Triac disposed in series with the stator winding between two terminals connectable to the AC source and the gate of which is coupled to the position sensor means via the piloting circuit connected to a DC voltage source, the piloting circuit being arranged to allow a current to flow into or out from the gate of the Triac in dependence on the state of the signal provided at the output from the position sensor means, wherein the DC voltage source comprises a rectifier circuit connected to an intermediate tap of the stator winding; and wherein the circuit is operable to cause the current to flow in the stator winding in a direction which depends only on the polarity of the voltage of the source and the instantaneous position of the rotor.

7. A circuit for controlling the rotation of a synchronous electric motor comprising a stator including a winding disposed around a stack of laminations and having an associated permanent magnet rotor, the circuit comprising:

controlled conductor means having control inputs, the controlled conductor means being connected to the stator winding and to an AC source;

position sensor means operable to determine the application to the control inputs of the controlled conductor means of electrical control signals of two states which vary as a function of the angular position of the rotor;

a piloting circuit connected in between the position sensor means and the controlled conductor means, wherein the position sensor means provide the electrical control signals of two states to the piloting circuit;

wherein the controlled conductor means comprise two Triacs each disposed in series with a half-winding of the stator in such a way as to form two circuit branches in parallel the terminals of which are connectable to the AC source; the gates of the Triacs being coupled to the position sensor means via respective piloting circuits one of which includes an inverter; and wherein the circuit is operable to cause the current to flow in the stator winding in a direction which depends only on the polarity of the voltage of the source and the instantaneous position of the rotor.

8. A circuit for controlling the rotation of a synchronous electric motor comprising a stator including a winding disposed around a stack of laminations and having an associated permanent magnet rotor, the circuit comprising:

controlled conductor means having control inputs, the controlled conductor means being connected to the stator winding and to an AC source;

position sensor means operable to determine the application to the control inputs of the controlled conductor means of electrical control signals of two states which vary as a function of the angular position of the rotor, wherein the position sensor means comprise a pair of sensors arranged to provide at least two output signals of two states phase displaced from one another to pilot the controlled conductor means;

a piloting circuit connected in between the position sensor means and the controlled conductor means, wherein the position sensor means provide the electrical control signals of two states to the piloting circuit; and wherein the circuit is operable to cause the current to flow in the stator winding in a direction which depends only on the polarity of the voltage of the source and the instantaneous position of the rotor.

9. A circuit according to claim 8, in which the sensors are two photodiode-phototransistor pairs fixed to the motor along the path of an intercepter member rotatable with the rotor and extending over a predetermined angular extent.

10. A circuit according to claim 8, in which the controlled conductor means comprise two controlled rectifiers each of which is piloted by one of the photodiode-phototransistor pairs.

11. A circuit according to claim 8, in which the phototransistors of the photodiode-phototransistor pairs are of npn type and are connected in antiparallel with one another; the controlled conductor means comprising a Triac the gate of which is coupled to the output of the phototransistors via two circuit branches in each of which are disposed respective diodes essentially in antiparallel with one another.

12. A circuit for controlling the rotation of a synchronous electric motor comprising a stator including a winding disposed around a stack of laminations and having an associated permanent magnet rotor, the circuit comprising:

controlled conductor means having control inputs, the controlled conductor means being connected to the stator winding and to an AC source;

position sensor means operable to determine the application to the control inputs of the controlled conductor means of electrical control signals of two states which vary as a function of the angular position of the rotor, wherein the position sensor means include a Hall-effect sensor, wherein the Hall-effect sensor comprises first and second photodiodes each of which is coupled to a respective pair of phototransistors; the photodiodes and the phototransistors being disposed in a fixed position with respect to the motor along the path of an intercepter member rotatable with the rotor and having a predetermined angular extent;

a piloting circuit connected in between the position sensor means and the controlled conductor means, wherein the position sensor means provide the electrical control signals of two states to the piloting circuit; and wherein the circuit is operable to cause the current to flow in the stator winding in a direction which depends only on the polarity of the voltage of the source and the instantaneous position of the rotor.

13. A circuit according to claim 12, in which the phototransistors associated with each photodiode are connected in antiparallel to the phototransistors associated with the other photodiodes and are of npn type; the controlled conductor means including first and second Triacs each of which is connected in series to a respective half-winding of the motor, in two circuit branches disposed in parallel between the terminals connectable to the AC source; the gate of the Triac being connected to the outputs of one or the other pair of transistors.

14. A circuit for controlling the rotation of a synchronous electric motor comprising a stator including a winding disposed around a stack of laminations and having an associated permanent magnet rotor, the circuit comprising:

controlled conductor means having control inputs, the controlled conductor means being connected to the stator winding and to an AC source;

position sensor means operable to determine the application to the control inputs of the controlled conductor means of electrical control signals of two states which vary as a function of the angular position of the rotor, wherein the sensor means comprise two Hall-effect sensors fixed to the motor in respective angularly spaced positions around the axis of rotation of the rotor, the outputs of the sensors being connected to a combinatorial logic circuit arranged to provide two output signals of two states offset from one another, obtained according a predetermined logic function of the signals provided by the sensors;

a piloting circuit connected in between the position sensor means and the controlled conductor means, wherein the position sensor means provide the electrical control signals of two states to the piloting circuit; and wherein the circuit is operable to cause the current to flow in the stator winding in a direction which depends only on the polarity of the voltage of the source and the instantaneous position of the rotor.

15. A circuit according to claim 14, characterized in that the controlled conductor means comprise a Triac the gate of which is connected to the output of the logic circuit via a piloting circuit comprising:

a transistor the base of which is connected to an output of the logic circuit and the collector-emitter path of which is connected to the gate of the Triac via a first diode operable to allow current to flow out from the gate;

a second diode between the other output of the logic circuit and the gate of the Triac and operable to allow current to flow into the gate; and a DC voltage source being connected to the base of the transistor and to the anode of the second diode.

16. A circuit according to claim 14, characterized in that the controlled conductor means comprise two Triacs each of which is connected in series with a half-winding of the motor in two circuit branches connected in parallel with one another between the terminals connectable to the AC source; the gates of the Triacs being coupled to the outputs of the logic circuit via respective piloting circuits.

17. The circuit of claim 9, wherein the predetermined angular extent lies in between a minimum value corresponding to the condition of a positively generated torque and a maximum value corresponding to the condition of a positively generated average torque.

* * * * *

UNITED STATES PATENT AND TRADEMARK OFFICE
CERTIFICATE OF CORRECTION

PATENT NO.    : 6,114,827
DATED         : September 5, 2000
INVENTOR(S)   : Nicolino Alvaro and Sebastiano Acquaviva Page 1 of 1

It is certified that error appears in the above-identified patent and that said Letters Patent is hereby corrected as shown below:

<u>Title page, Item [75],</u>
Please delete "Turin" and insert thereof -- Torino --;
Please insert -- Sebastiano Acquaviva, Torino, Italy --.

Signed and Sealed this

Fourteenth Day of August, 2001

*Attest:*

*Attesting Officer*

NICHOLAS P. GODICI
*Acting Director of the United States Patent and Trademark Office*